United States Patent [19]

Furucz

[11] 4,003,357

[45] Jan. 18, 1977

[54] CARBURETION SYSTEM FOR INTERNAL COMBUSTION MOTOR

[76] Inventor: Istvan Furucz, 3964 Saint-Denis, Montreal, Quebec, Canada

[22] Filed: Jan. 21, 1975

[21] Appl. No.: 542,858

[30] Foreign Application Priority Data

Jan. 22, 1974 Canada .............................. 190804

[52] U.S. Cl. .......................... 123/127; 123/59 PC; 123/121; 123/139 BG; 261/39 D; 261/23 A
[51] Int. Cl.$^2$ ........................................ F02M 11/00
[58] Field of Search ............. 123/121, 59 PC, 127, 123/122 AB, 122 A, 139 BG, 52 MV, 179 L, 179 G, 106, 187.5 R, 139 AW; 261/23 A, 39 D

[56] References Cited

UNITED STATES PATENTS

| | | | |
|---|---|---|---|
| 2,036,253 | 4/1936 | Bremser | 123/139 BG |
| 2,145,863 | 2/1939 | Curioni | 261/23 A |
| 2,430,693 | 11/1947 | Udale | 261/23 A |
| 2,564,113 | 8/1951 | Kihler | 261/23 A |
| 2,597,780 | 5/1952 | Engnath | 261/23 A |
| 3,549,132 | 12/1970 | Haase | 261/23 A |
| 3,826,234 | 7/1974 | Cinquegrani | 123/139 |

*Primary Examiner*—Ronald H. Lazarus
*Attorney, Agent, or Firm*—Alan Swabey & Co.

[57] ABSTRACT

The disclosure describes a carburetion system for internal combustion motor comprising a carburetor, a heat exchanger and an admission block. The carburetor has a carburetion chamber for each motor cylinder and is provided with a motor-fuel reservoir, each chamber having a butterfly valve for controlling the introduction of air. A primary circuit individually feeds each chamber from the reservoir while a secondary circuit, which is independent from the chambers, directly feeds the motor cylinders with an excess of motor fuel which is fed from the reservoir. The heat exchanger, which is connected to the carburetor, comprises an independent heat exchange compartment for each carburetion chamber to which it is connected for enabling the mixture which is produced in the chamber to flow directly into the compartment. The combustion gases of the motor are brought around the compartments for evaporating the motor fuel of the mixture which flows therein. The heat exchanger also comprises a secondary circuit which is independent from the compartments and is connected to the secondary circuit of the carburetor for directly feeding the motor cylinders with an excess of motor fuel. The admission block is connected to the exchanger and comprises independent admission chambers, each one of them being connected to a compartment of the exchanger. Moreover, each chamber is connected to the secondary circuit of the heat exchanger in order to feed each motor cylinder with a mixture and with an excess, of motor fuel.

19 Claims, 18 Drawing Figures

CARBURETION SYSTEM FOR INTERNAL COMBUSTION MOTOR

BACKGROUND OF THE INVENTION

1. Field of the Invention

The present invention relates to a carburetion system for internal combustion motor. It can be adapted for use with any motor of this kind, whatever the number and size of the cylinders.

2. Description of the Prior Art

In general, the principle upon which the system according to my invention is based consists in utilizing the energy of the heat which is released by the motor itself, more specifically by the exhaust gases, in order to convert the hydrocarbon into vapor between the carburetor and the admission to the motor cylinders. In this manner, the mixture of motor fuel vapor and air which penetrates into the cylinders where the explosion takes place, is very efficient.

According to the above principle, an object of my invention is therefore to provide a device enabling to improve the carburetion of the internal combustion engines in order to obtain a substantial reduction of the consumption of the motor fuel while preserving the original performance of the motor.

Another object of the invention consists in decreasing in a substantial manner the pollution caused by carbon monoxide and other toxic debris while obtaining an improved combustion of the motor fuel.

An additional object resides in the fact that the system of carburetion according to my invention allows a reduction of the wear of the mechanical pieces of the motor, which for a good part is caused by particles of debris which are formed by incompletely burnt or unburnt motor fuel and are carried by the lubricating oil of the motor.

In order to achieve the above objects, the carburetion system which is proposed by the present invention enables each motor cylinder to have its own carburetion, which carburetion is moreover distinct and independent from that of the other motor cylinders. Moreover, the system is adapted so as to make sure that the motor fuel mixture which is sent to the motor cylinders has a volume ratio fuel-air which is always constant whether the motor is idle, is under acceleration or rotates at cruising speed. Finally, the system enables to directly send to the motor cylinders an excess of motor fuel thus allowing for an easy start under cold weather conditions, or even when the weather is hot after the motor has been stopped for a certain period of time.

SUMMARY OF THE INVENTION

Fundamentally, the carburetion system according to my invention comprises a heat exchanger which is heated at high temperature by the exhaust gases, such as mentioned previously, and which converts the mixture motor fuel-air into a mixture comprising motor fuel vapor and air; this exchanger being used in combination with a new type of carburetor which is especially adapted to meet the requirements of the exchanger. This carburetor comprises a body provided with a number of carburetion chambers which is equal to the number of motor cylinders of the motor to which it is intended and with a motor fuel reservoir, each of the carburetion chambers being provided with means to control the admission of air, such as conventional butterfly valves. The carburetor has a primary circuit which individually feeds each carburetion chamber from said reservoir as well as a secondary circuit which is independent of the primary circuit and of the carburetion chambers, said secondary circuit being intended for directly feeding the motor cylinders with an excess of motor fuel, which motor fuel always comes from the reservoir. The carburetor also comprises a control mechanism which operatively connects the butterfly valves and the primary circuit to make sure that the motor fuel-air mixture has a constant volume ratio. On the other hand, the heat exchanger which is connected to this carburetor comprises a body having a number of independent heat exchange compartments which is equal to the number of carburetion chambers, each compartment being connected to one of these chambers in order that the mixture which has been formed therein directly flows into the compartment to which it is intended. Means are provided for bringing the combustion gases of the motor around the compartments in order to evaporate the motor fuel of the mixture which flows therein. The exchanger also comprises a secondary circuit which is independent of the compartments, and is connected to the channels of the secondary circuit of the carburetor for directly feeding the motor cylinders with an excess of motor fuel. Finally, the system of carburetion according to my invention comprises an admission block which is connected to the body of the exchanger and which comprises independent admission chambers each one of which is connected on the one hand to one of the compartments and on the other hand to one of the motor cylinders. The secondary circuit of the exchanger which receives the excess of the motor fuel is also connected to this admission block. In this manner, each motor cylinder is supplied with a mixture having a constant motor fuel-air ratio, and possibly, with an excess of motor fuel.

BRIEF DESCRIPTION OF THE DRAWINGS

Other characteristics of the invention will appear from the description which follows of a practical embodiment, given only by way of an example and without limitation, this description referring to the drawings in which.

DESCRIPTION OF THE PREFERRED EMBODIMENTS

I will first of all refer to FIGS. 1 to 9 which illustrate the carburetor of the carburetion system according to my invention.

It should be mentioned at first that this carburetor is coupled to a gas pump having a higher capacity than the flow of the carburetor in order to produce a constant low pressure in the reservoir described hereinafter. Preferably, there will be used a twin gas pump, of the diaphragm and differed action type, illustrated in FIG. 9.

Figure 9:
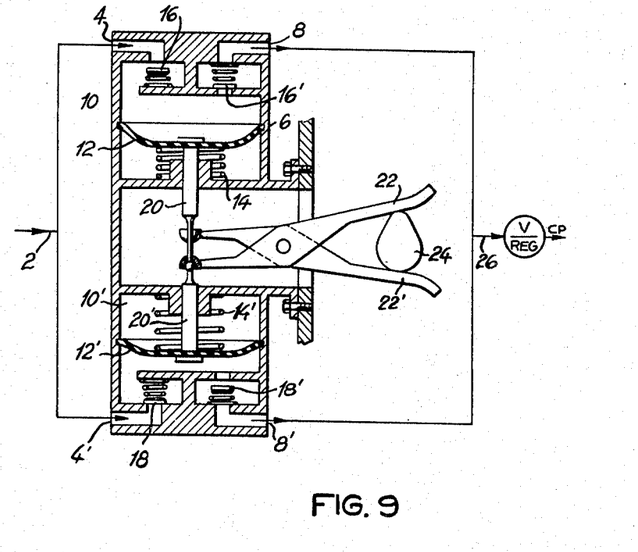
FIG. 9 is a diagram illustrating a portion of the feeding circuit of the reservoir of the carburetor.

In this type of arrangement, the feed 2 from the reservoir (not illustrated) is divided into two to be poured into the two entrances 4 and 4' of the body 6 of the twin pump, also provided with two outlets 8 and 8'. The body 6 has two chambers 10, 10' which are provided with diaphragms 12 and 12' the latter being urged by the springs 14, 14'. The entrances 4, 4' and the outlets 8, 8' of each chamber 10, 10' are controlled by unidirectional valves 16, 16' for the chamber 10, and 18, 18' for the chamber 10', these valves operating in reverse direction, as shown. The diaphragms 12, 12' are operated by push rods 20, 20' which are driven by a common lever 22 movable in oscillatory movement by a shaft 24 provided with a flap 26 acting at one end while the other end is applied to the ends of the push rods 20, 20'. The shaft 24 is obviously operated by the motor itself.

In the present description, it will easily be understood that when the shaft 24 rotates, one of the diaphragms 12, 12' produces a suction and the other one creates a compression in the duct 26 connected to the reservoir of the carburetor through an adjustable pressure regulator PR. By means of this twin pump, it is thus possible to eliminate the pulsations of the feed. On the other hand, the PR regulator allows a control of the pressure inside the motor fuel reservoir, described hereinunder.

Figure 10:
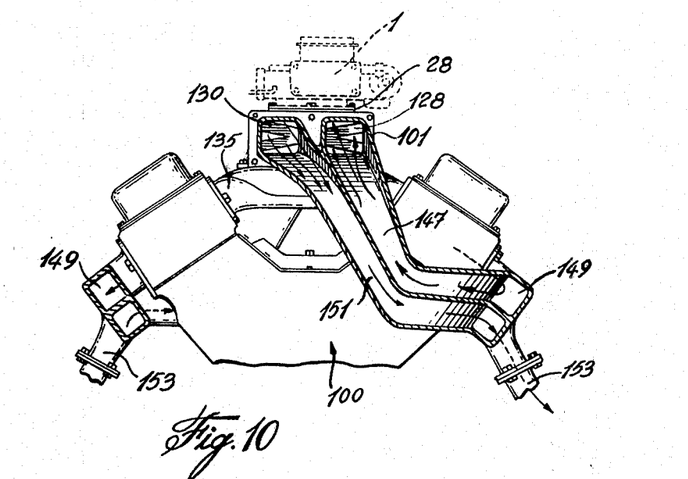
FIG. 10 is a view in elevation of the system of carburetion mounted on a V-motor, the view being partially cut out in order to show the interior of certain elements.

Now coming back to FIGS. 1 to 7, the carburetor according to my invention comprises a solid body 1 intended to be disposed in known manner between a heat exchanger 3 forming part of my system, and an air filter 5. The body 1 of the carburetor is preferably mounted on the exchanger 3 by disposing therebetween a thermic insulating material (FIG. 10) of high performance, to protect the body 1.

It should be mentioned at this time that the carburetor can be directly mounted on the internal combustion motor, i.e. without using the heat exchanger.

Figure 4:
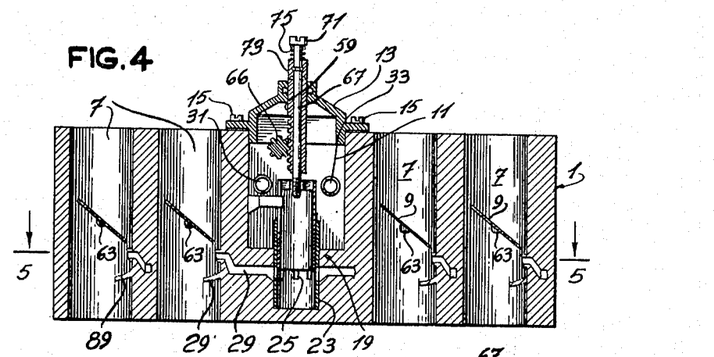
FIG. 4 is a vertical cross-section taken along line 4—4 of FIG. 5.

As particularly shown in FIG. 4, the body 1 is bored with a number of carburetion chambers 7 which is equal to the number of motor cylinders of the motor (FIG. 10) to which it is intended. Each chamber is provided with a conventional butterfly valve 9 for controlling the admission of air. At the center of the body 1 there is a reservoir 11 which opens on the face which is adjacent to the air filter 5 and which is hermetically closed by a sealing cover 13 which is kept in place by any known means such as screws 15. The reservoir 11 is filled with motor fuel by means of the feeding system, described above in connection with FIG. 9, which feeds a channel 17 directly opening into the reservoir. As also mentioned previously, a pressure regulator PR is preferably mounted at the inlet of the channel 17 and the system for feeding the motor fuel preferably comprises a twin pump in order to eliminate any pulsation in the feed. I mention again that the motor fuel in the reservoir 11 is maintained under a low pressure when the motor runs and that the pressure regulator PR can be adjustable.

The carburetor according to the invention comprises a primary circuit for feeding the carburetion chamber 7 and a secondary circuit for directly feeding the motor cylinders, the latter circuit, bypassing the carburetion chambers 7 and sending, according to needs, an excess of motor fuel to the motor cylinders.

The primary circuit comprises a valve 19 so-called accelerator valve since truly speaking its operation is related to the accelerator pedal as will be pointed out hereinafter. The primary circuit also comprises a network of channels which run from the valve 19 to the various chambers 7.

Figure 7:
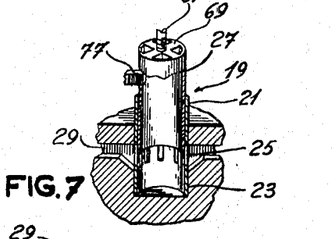
FIG. 7 is a cross-section view of a detail illustrating the accelerator valve.

The accelerator valve 19 is illustrated in detail in FIG. 7 where it will be seen that it comprises a cylindrical casing 21 removably mounted in a pit 23 formed at the bottom of the reservoir 11 and projecting to some extent inside the reservoir. A number of apertures 25 are provided through the casing 21, it being understood that there is one aperture for each chamber 7 as will be explained more in detail hereinafter. These apertures have the shape of slots which are elongated axially with respect to the casing 21. Finally, a hollow piston 27 is slidably mounted inside the casing 21, this piston being open at both ends thereof. Being so constructed, it will easily be understood, particularly with reference to FIG. 7, that the sliding of the piston 27 permits an adjustment of the opening of the apertures 25. Moreover, the elongated shape of these slots will allow a much more precise adjustment of their opening during the travel of the piston 27. Finally, the latter is hollow and open at both ends thereof and the apertures 25 will enable the motor fuel to escape under pressure from the reservoir 11 in a quantity which is proportional to the size of the opening of the apertures 25.

Figure 5:
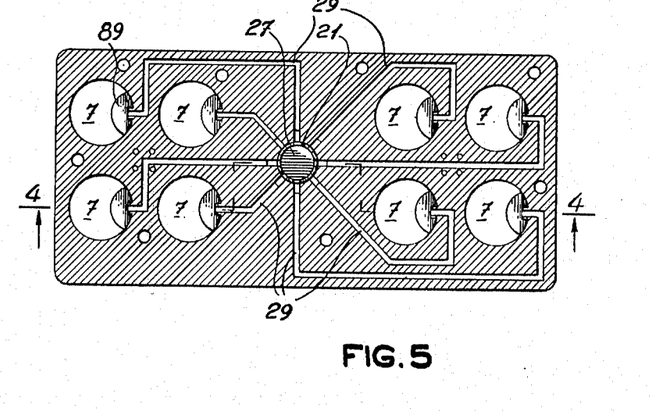
FIG. 5 is a horizontal section taken along 5—5 of FIG. 4 at a level somewhat lower than the one of FIG. 3.
Figure 6:
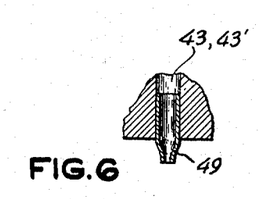
FIG. 6 is a cross-section view of a construction detail which illustrates a jet in enlarged scale.

This primary circuit also comprises a network of channels which are better illustrated in FIG. 5. Each channel 29 starts from the casing 21 and ends up into one of the chambers 7 so that it will be sufficient to describe only one of them. As shown in FIG. 7, each channel 29 has a generally rectangular section in which one end is enlarged to be suitably dimensioned to the approximate size of the corresponding aperture 25. At the other end, the channel 29 is raised to some extent after which it terminates into corresponding chamber 7 by slightly projecting into it. The elevation 29' of each channel 29 should be sufficient to enable the channel 29 to be at all times filled with motor fuel thereby constituting a plug preventing the air from penetrating inside the reservoir 11 when the motor is stopped and when the pumps are not operating.

Figure 1:
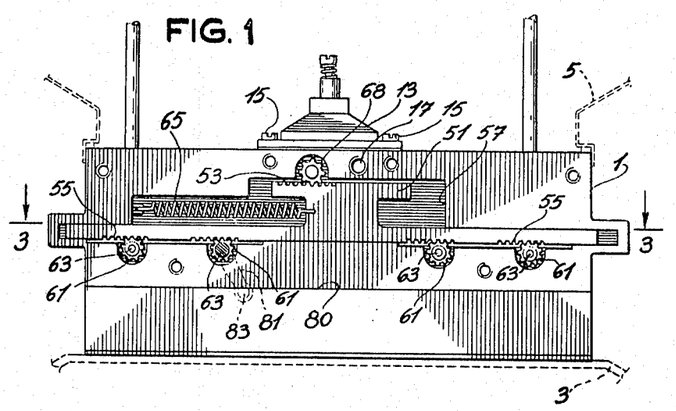
FIG. 1 is a view in elevation of a carburetor incorporated in the system of my invention, the cover having been removed to show the aforesaid control mechanism.
Figure 2:
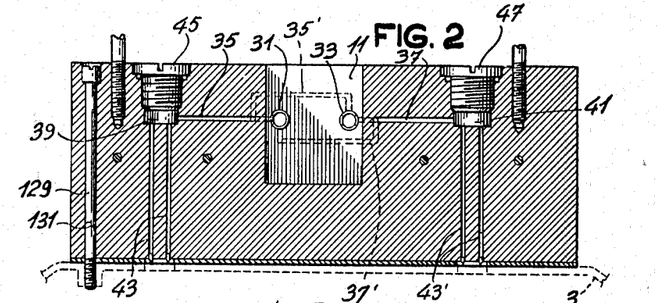
FIG. 2 is a vertical cross-section taken along the plane of line 2—2 of FIG. 3.
Figure 3:
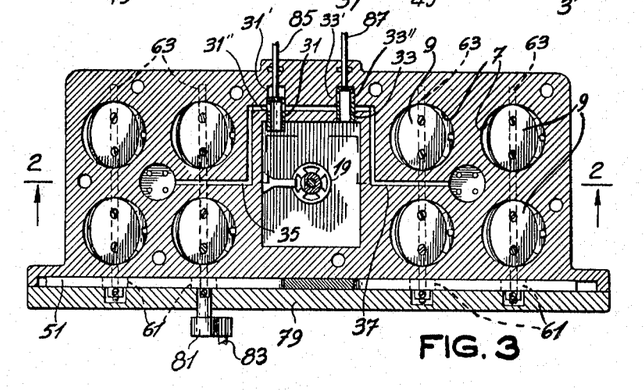
FIG. 3 is a horizontal section taken along the plane of line 3—3 of FIG. 1.

Referring now to FIGS. 2, 3 and 4 it will be seen that the secondary circuit comprises two automatically operating valves 31, 33 which have the shape of a cylinder open at the end corresponding to the reservoir 11. These valves slide in borings 31', 33', bored in the body 1 of the carburetor. The wall of the valves 31 and 33 are provided with openings 31", 33" which communicate with a network of channels when the valves are in the open position, thus allowing to bring an excess of motor fuel directly to the motor cylinders. A more detailed description of these valves 31, 33 and of their operation will be given below.

This network is formed of ducts 35, 37 which respectively run from valves 31, 33, and bypasses 35', 37 which respectively run from the duct 35 to valve 33 and from the duct 37 to the valve 31. In this manner, it will be understood that the valves 31, 33 are mounted in parallel and that the ducts 35, 37 are fed when at least one of the two valves 31, 33 is open.

The ducts 35, 37 open in chambers 39, 41 which have been provided for the perforation of the ducts 43, 43'. There is the same number of ducts as the number of motor cylinders, and they are adapted to open in other ducts of the exchanger which directly and separately lead to each of the motor cylinders. The ends of the ducts 43, 43' are provided with removable jets 49 (FIG. 6) which are calibrated independently of the number of cylinders of the motor while taking into consideration the amount of fuel supplied by the accelerator valve 19 during an idling period. The chambers 39 and 41 are closed in known manner by means of stoppers 45, 47.

Coming back to the primary circuit, the carburetor according to the invention has a control mechanism which is simultaneously connected to each of the butterfly valves 9 and to the accelerator valve 19 in order to obtain a synchronized action enabling the adjustment, in a single operation, of the flow of air and of motor fuel inside the chambers 7, thereby making sure to obtain at all times a constant desired ratio.

This mechanism comprises a first toothed rack 21 (FIG. 1) with double toothed surface 53, 55, slidably mounted in a housing 57 inside body 1 and a second toothed rack 59 (FIG. 4) which is axially fixed to the piston 27 of the acceleration valve 19.

The toothed surface 55 of the toothed rack 51 meshes with pinions 61 which are fixedly mounted at one end of the pivoting axes 63 on which the butterfly valves 9 are attached. With respect to the second toothed rack 59, it meshes with a pinion 66 which is fixed at one end of a shaft (not illustrated) in which the other end is provided with a pinion 68 (FIG. 1) meshing with the toothed surface 53 of the toothed rack 51. Finally, the pinions 63, 68 and the corresponding toothed surfaces 55, 53 are firmly and constantly engaged together by means of a tension spring 65 in order to prevent any play which can cause rattling.

Referring again to FIG. 4, the second toothed rack 59 comprises a rod which is threaded at its lower end to a crossshaped support 69 which is solid with piston 27 of the accelerator valve 19. The rod has a head 71 which is provided with a screwdriver's slot to enable an adjustment of the piston 27 to any depth required in the casing 21 thus obtaining a minimum opening of the apertures 25 during idling conditions, as will be explained hereinbelow.

The rod 67 slides in a case 73 and is maintained somewhat resiliently therein by means of the spring 75 between the case and the head 71. One face of the case 73 is toothed and meshes with the pinion 75.

Finally, in order to prevent an undue rotation of the piston 25 during the adjustment by means of the rod 67, there is provided a guide 77 which is fixed on the wall of the reservoir 11 and extends in the direction of the piston 27 in order to penetrate into a longitudinal channel of the latter, thus preventing the rotation of the piston 27 mainly when it is being adjusted, and also during the sliding when the valve 19 is operated.

One of the axes 63 extends through the cover 79 (FIG. 3) and, since it is solid with the corresponding pinion 61 it is connected to a system of rods illustrated in the drawings only by the rod 81 and the crank 83. When the accelerator pedal is pressed down, this system of rods, which is of conventional design, will enable to cause a clockwise pivoting of said axis 63. A return mechanism (not illustrated) will make sure that the accelerator valve 19 and the butterfly valves 9 return to slowed down position when the accelerator pedal is released.

The primary circuit operates as follows.

Upon ignition the piston 27 of the accelerator valve 19 is at a low level causing an opening of the apertures 25 to make sure that the motor is idling. When the driver pushes on the accelerator pedal, the first pinion 61 is rotated clockwise by the system of rods which causes the toothed rack 51 to slide towards the right of FIG. 1, the other pinions 61 meshing with the toothed surface 55 are rotated clockwise and the pinions 68 and 66 are rotated counter clockwise. If we refer to FIGS. 3 and 4, it will be realized that the butterfly valves 9 will open to introduce air into the chambers 7 and the toothed rack 59 will move upwardly carrying the piston 27 and enlarging the opening of apertures 25.

The synchronization of the movements of the butterfly air valves 9 and of the opening of the accelerator valve 19 will enable to introduce into the motor cylinders during acceleration a larger quantity of the mixture which however always remains within the constant pre-established volume ratio resulting in an acceleration without undue loss of fuel. It is known that the ideal ratio of mixture of fuel and air should give a volume ratio made up of 68% motor fuel vapor and 32% air.

It should be observed in passing that the cover 79, which was mentioned above, rests on a shoulder 80 (FIG. 1) and is maintained in this position by any conventional means.

It has been mentioned previously that the secondary circuit comprises two automatic valves 31, 33. Valve 31 has a control rod 85 which is tied to a coil (FIG. 8) connected to a thermostat T the latter depending on the temperature of the cooling liquid of the motor. In similar manner, the valve 33 has a control rod 87 bound to a coil connected to a manometer P (FIG. 8) dependent on the pressure of the lubricating oil of the motor.

Figure 8:
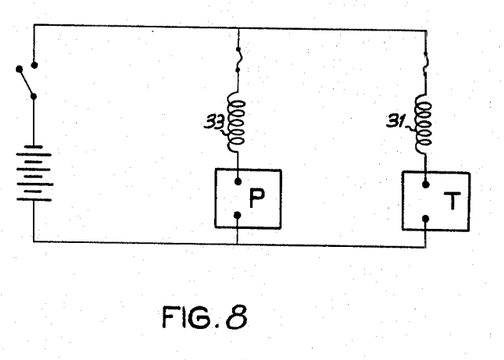
FIG. 8 is a simple electric diagram incorporating the two automatic control valves of the secondary circuit of the carburetor.

Upon ignition during cold weather, the piston of the valve 31 is in position to introduce motor fuel with the openings 31" facing the channel 35 and 37' so that as soon as the ignition is on, the motor fuel is immediately sent in the motor cylinders via duct 43. As soon as the temperature of the cooling liquid reaches a predetermined value, the piston of the valve 31 raises in the boring 31' and closes the openings 31".

The valve 33 operates in similar manner except that it is responsive to the oil pressure of the motor lubricating oil. This valve is mostly useful when the carburetor is mounted on a heat exchanger and the mixture of motor fuel coming from the chambers 7 should first pass in the exchanger before reaching the motor cylinders. Even when the motor is hot, this delay can produce misfires in the motor. In order to prevent this, only the valve 33 opens, since the motor being hot, the valve is closed. This will enable to send to the motor cylinders an excess of fuel which will result in a fast start. As soon as the oil pressure has climbed sufficiently, the manometer P closes the valve 33.

It will be remembered that the ducts 35 and 37 comprise bypasses 35', 37' so arranged as to permit a direct feeding even when only one of the automatic valves 31, 33 is open.

The following auxiliary characteristics should be noted.

The casing 21 of the accelerator valve 19 as well as the jets 49 are interchangeable thus enabling the carburetor to be adapted to motors of different powers. For a more powerful motor, a casing 21 in which the apertures 25 are larger will be used, thus permitting a more important feeding of fuel for the same length of travel of the piston 27. The same is true with respect to the jet 49 in which the opening should be adjusted with respect to the larger volume of liquid fuel used.

The carburetor according to my invention, particularly when it is used with a heat exchanger of which the description will follow, enables a substantial decrease of the fuel consumption while the motor behaves with the same performance. Consequently, the result is a notable decrease of the pollution resulting in a large part from unburnt hydrocarbons. Also the carburetor according to my invention reduces the wear of the mechanical elements, which is in large part due to the abrasive action of the unburnt hydrocarbons carried by the oil, as mentioned above.

I now refer to FIGS. 10 to 18 which illustrate the exchanger per se as well as the admission of my system. The latter is illustrated in use on a V-8 motor but it will be understood from the description which follows as well as from the above description of the carburetor that the example is not given by way of restriction. The carburetion system of my invention can indeed also be adapted to a motor having a lower or higher number of motor cylinders and to motors in which the cylinders are mounted in V or in line.

The exchanger 3 per se comprises a body 1 having the shape of an upright prism. In the example with which we are concerned, the exchanger is designed to receive eight independent feeds and also to be used with eight motor cylinders 103, two of which have more particularly been illustrated in FIG. 12 where a portion of the V-8 motor 100 is shown in dotted lines.

The body 101 has been bored and divided into two equal parts by means of a longitudinal partition 105. The upper wall 107 is formed with eight circular openings 109 and the bottom portion 110 also has eight circular openings 111 (FIG. 12), each of the latter corresponding to an opening 109 and being generally coaxial therewith. In this manner, there are four openings 109 on each side of the partition wall 105, close to the latter. These openings 109 and 111 correspond to heat exchange compartments 113 (FIGS. 11 and 12) of zig-zag shape and independent from one another. Since the exchanger is symmetrical with respect to the plane of the central partition 105, the description which follows of these compartments will refer only to the portion illustrated in FIG. 11, it being understood that the other portion is identical.

Figure 11:
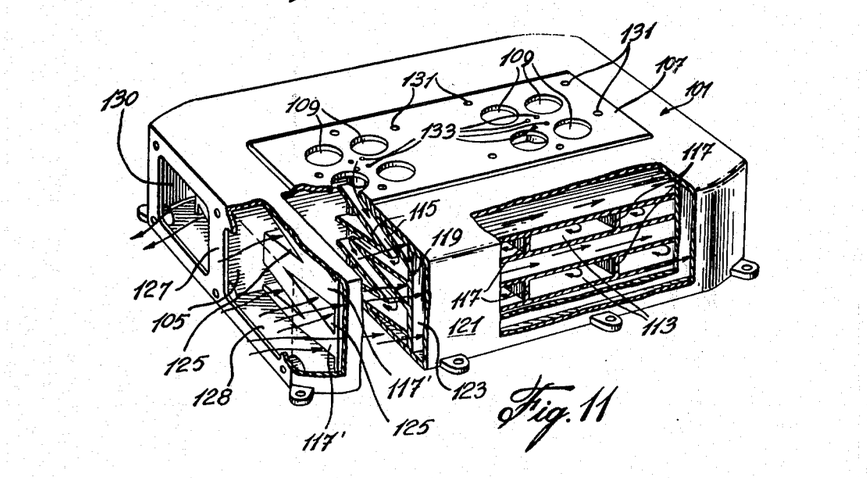
FIG. 11 is a perspective view, partially in cross-section, of the exchanger.
Figure 12:
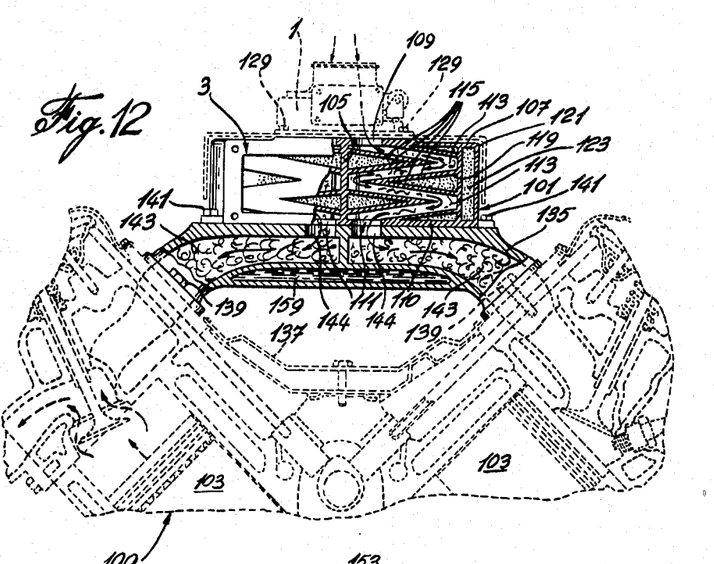
FIG. 12 is a view in elevation of the motor, partially in cross-section along line 12—12 of FIG. 4, showing the inside of the exchanger and of the admission block.

These compartments are obtained, for example, by means of small plates 115 which are arranged as horizontal V inserted into one another as shown in FIGS. 11 and 12. Vertical partitions 117 disposed on either side of the openings 109, define with the partition 105 and a front wall 119, the above mentioned independent compartments 113. In order to obtain a maximum yield with the exchanger and to prevent any condensation of the fuel of the mixture during its passage into the exchanger, it is proposed to mount the front wall 119 spaced from the adjacent side 121 of the body 101 of the exchanger thus forming a rectangular passage 123 for the hot gases as will be explained below. Two end partitions 117' having the general shape of a W lying down, close the end compartments 113. Therefore, the net result is that the compartments 113 define transverse passages in zig-zag shape which are continuous between the entrances 109 and the outlets 111 of the fuel mixture; these passages being separated by longitudinal triangular passages 125.

As will clearly be seen in FIG. 11, the end partitions 117' are preferably spaced from the ends 127 of the body 101 thus defining inlet and outlet chambers 128 and 130 for the hot gases. When a V-8 motor is used, wherein the exchanger is divided into two parts, the hot exhaust gases of the motor are received, on one side, in inlet chamber 128 and thereafter pass through longitudinal triangular passages 125 for heating and evaporating the fuel whose mixture flows in the compartments 113. The same process is applied on the other side of the exchanger but in reverse direction, the exhaust gases exiting from the outlet chamber 113 as shown in FIG. 11.

As mentioned previously, the carburetor 1 is mounted on the face 107 of the exchanger in order that the carburetion chambers 7 of the carburetor correspond exactly with the openings 109 of the exchanger which open on the compartments 113. The carburetor can be fixedly mounted on the exchanger by any known means, such as by means of bolts 129 (FIGS. 2 and 12) inserted in holes 121 and threaded on the admission block which is described hereinafter. The mounting is preferably carried out by placing an insulating plate 28, mentioned previously, between the carburetor and the heat exchanger.

It is important to note here that the exchanger, contrary to the carburetor, is provided with a secondary circuit which is independent of the compartments 113 and is connected to the channels 43 by means of the jets 49 of the carburetor. These jets 49 are introduced in straight ducts 133 (FIGS. 11 and 18) which extend through the central partition 105 to end up in the admission block of which a description will follow.

This block 135 bridges the exchanger 3 and the heads of the motor cylinders as clearly shown in FIG. 12 by being on the one hand fixed to the head 137 of the motor 100 by means of the bolts 139, and on the other hand, by receiving the exchanger 3 which is mounted thereon by means of bolts 141. The block 135 is divided into the same number of admission chambers 143 as the number of compartments 113 in the exchanger 3, each chamber 143 having its own compartment 113 and communicating therewith by means of circular openings 144 of the same size and completely corresponding to the openings 111 of the bottom of the exchanger 3. It results therefore that there is a continuity between the carburetion chambers 7 of the carburetor, the compartments 113 of the heat exchanger, the admission chambers 143 and the motor cylinders 103 of the motor 100.

Referring again to FIG. 18, it will be noted that the ducts 133 are in communication with borings 145, which are adjacent to the openings 144 mentioned above, thus permitting the ducts 133 to open into the admission chambers 143. Again, it will result that there is a continuity between the channels 45 of the secondary circuit of the carburetor 1 (FIG. 2), the ducts 133 of the secondary circuit of the exchanger 3, the admission chambers 143 and the motor cylinders 103.

Figure 13:
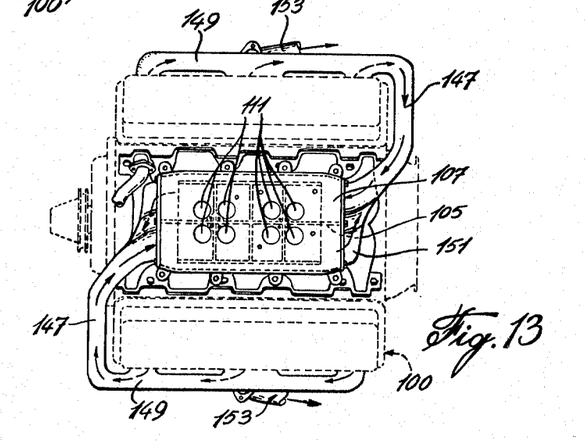
FIG. 13 is a plan view of the system and of the V-8 motor.

If we refer now more particularly to FIG. 13, it will be realized that tubular connections 147 connect the exhaust gas collectors 149 and the admission chambers 128 (FIG. 11) of the exchanger and that tubular outlets 151 connect the outlet chambers 130 of the exchanger and the exhaust pipe(s) 153 which obviously discharge into the atmosphere. This is obviously true for all the parts of the exchanger which are separated by the central partition 105. FIG. 13 will show that in the case of a V-8 motor which is illustrated, the hot exhaust gases will flow simultaneously on both sides of the central partition 105 of the exchanger but in opposite direction which will enable to obtain a uniform heat distribution.

Figure 14:
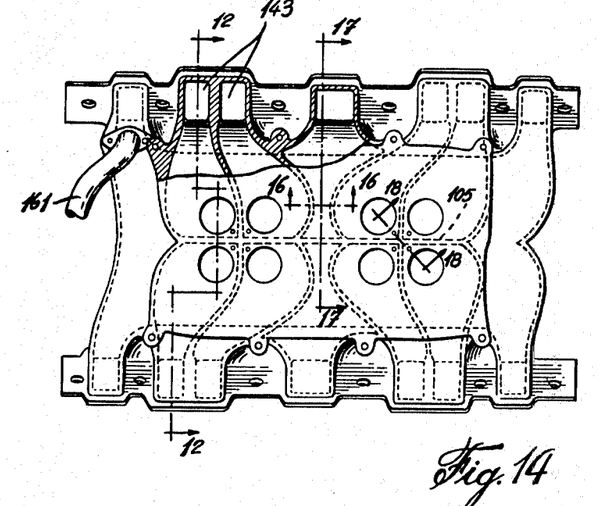
FIG. 14 is a plan view, which has been partially cut away to show certain details inside the admission block.
Figure 15:
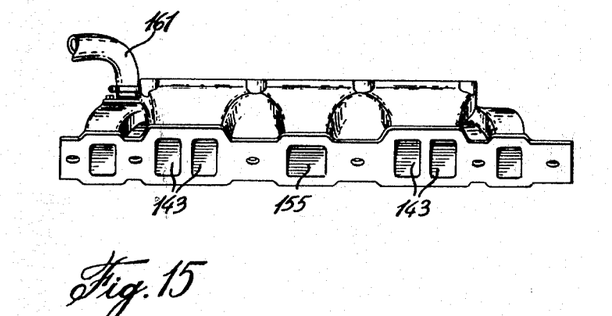
FIG. 15 is a side view of the admission block.
Figure 16:
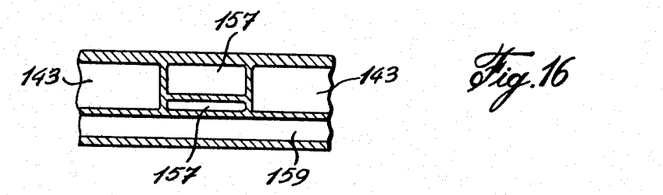
FIGS. 16, 17 and 18 are views respectively taken along lines 16—16, 17—17 and 18—18 of FIG. 14.
Figure 17:
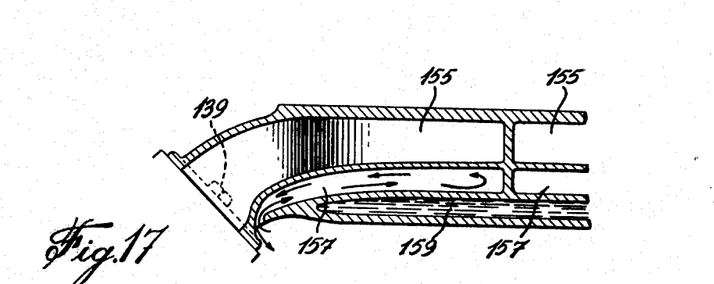
Figure 18:
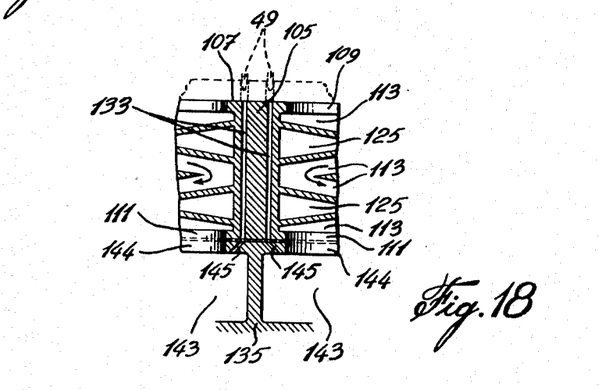

As can be seen in FIG. 17, taken along line 17—17 of FIG. 14, a portion of the exhaust gases can be bypassed into expansion chambers 155 located under the exchanger, particularly in the case of a V-8 motor, in order to keep the exchanger hot and to prevent the formation of frost under cold weather conditions. However, in order to prevent the over-heating at this particular place, there is provided a cooling cushion for the lower portion of the chambers 155 in the form of air ducts 157 and of a channel 159 containing the cooling liquid of the motor, which channel is fed by a hose 161 connected to the circulation pump for the cooling liquid mentioned above. This liquid has a temperature of about 160° to 170° F (71.1° to 76.7° C) which is sufficiently hot on the other hand to prevent the condensation of the fuel in the adjacent chambers 143 (FIG. 14) of the admission block 135.

From the above description, it will therefore be understood that the carburetion system according to my invention will enable the evaporation of the fuel of the mixture before it is introduced in the motor cylinders, thus reducing the cost of the fuel but also making sure that the combustion is better with the result that pollution is reduced. In addition, the volume ratio of the components of the mixture is constant whether the motor is idle, is under acceleration or rotates at cruising speed. Finally, according to this system, an excess of fuel is directly sent from the reservoir 11 to the motor cylinders 103 for an efficient start, by short-circuiting the carburetion chambers 7 and the compartments 113 of the exchanger.

In order to better use the heat which is available in the exhaust gases and to prevent that the foreseen operation of this heat exchange is disturbed by seasonal temperatures, it will be desirable that the exhaust ducts 147 – 149 and all the parts of the heat exchanger 101 which are in direct contact with ambient air be coated and protected by a heat insulating material.

Obviously many changes can be made to the specific embodiment described above by way of example without however departing from the spirit of the invention which should only be limited by the appended claims.

I claim:
1. Carburetion system for internal combustion motor having a predetermined number of motor cylinders, said system comprising:
A. a carburetor comprising:
  a. a body provided with a number of carburetion chambers which is equal to the number of motor cylinders of the motor to which said body is intended, said body being provided with a motor fuel reservoir, each chamber having means for controlling admission of air therein;
  b. a primary circuit individually feeding each carburetion chamber from said reservoir;
  c. a control mechanism connecting said means for controlling admission of air and feed of said primary circuit to provide a constant volume ratio of a mixture comprising motor fuel and air which is formed in the carburetion chamber; and
  d. a secondary circuit, which is independent from said carburetion chamber, said secondary circuit adapted to directly feed said motor cylinder with an excess of motor fuel from said reservoir;
B. a heat exchanger connected to said carburetor and comprising:
  a. a body provided with a number of independent heat exchange compartments which is equal to the number of carburetion chambers, each compartment being connected to one said chamber so that the mixture carried out in one chamber flows directly into an appropriate compartment;
  b. means to bring combustion gases from said motor around said compartments in order to evaporate the fuel of the mixture which flows therein;
  c. a secondary circuit, which is independent from said compartments and is connected to the secondary circuit of said carburetor for directly feeding said motor cylinders with an excess of fuel;
  d. an admission block connected to said body of said heat exchanger comprising independent admission chambers each being connected to one of said compartments, each chamber being provided with means connecting said chamber also with one of said motor cylinders as well as with said secondary circuit of said heat exchanger in order to enable feeding of each motor cylinder with a mixture of motor fuel and air and with an excess of motor fuel.

2. Carburetion system for internal combustion motor having a predetermined number of motor cylinders, said system comprising:
A. a carburetor comprising:
  a. a solid body in which a same number of carburetion chambers has been bored as the number of motor cylinders of said motor to which said body is intended, each chamber being provided with a butterfly valve for controlling air admission therein; the body having a motor fuel reservoir therein and being provided with means for feeding a motor fuel, said means including a channel opening into said reservoir for filling the same;
  b. a primary circuit for feeding the motor cylinders with motor fuel, said primary circuit comprising an accelerator valve in said reservoir and channels individually connecting each carburetion chamber to said accelerator valve in order that opening of the latter simultaneously and separately feed all the carburetion chambers;

c. a control mechanism simultaneously connected to all said butterfly valves and to the accelerator valve in order to produce a synchronized action enabling an adjustment in a single motion of a flow of air and motor fuel in said carburetion chambers, thus producing a constant volume ratio of the components of the mixture comprising motor fuel and air;

d. a secondary circuit for directly feeding the motor cylinders, said secondary circuit being independent of the feeding of the carburetion chambers; said secondary circuit comprising two automatically controlled valves in said reservoir and channels leading from said valves to the exterior of said body to be connected to said motor cylinders for feeding the same with an excess of motor fuel;

B. a heat exchanger connected to said carburetor and comprising:

a. a body provided with a number of independent heat exchange compartments equal to the number of carburetion chambers, each compartment being connected to one said chamber in order that the mixture produced in one chamber directly flows into a corresponding compartment;

b. means to bring combustion gases from said motor around said compartment to evaporate the motor fuel of the mixture which flows therein;

c. a secondary circuit, which is independent from said compartments and is connected to the secondary circuit of said carburetor for directly feeding the motor cylinders with an excess of fuel;

C. an admission block connected to said body of said exchanger and comprising independent admission chambers each admission chamber being connected to one said compartments, each chamber being provided with means also connecting it to one said motor cylinders as well as to the secondary circuit of said heat exchanger in order to feed each said motor cylinder with said fuel mixture and an excess of fuel.

3. Carburetion system for an internal combustion motor having a predetermined number of motor cylinders, said system comprising:

A. a carburetor comprising:

a. a solid body made of light alloy provided with a number of carburetion chambers which is equal to the number of motor cylinders, whatever the number of cylinders of the motor to which said carburetor is intended, each chamber being provided with a butterfly control valve for introducing air therein; said body having a motor fuel reservoir formed therein;

b. said reservoir of said carburetor being provided with means for feeding fuel comprising a channel opening into said reservoir for filling the same through a pressure regulator enabling a regulation of the pressure inside said reservoir, said reservoir being fed by means of a fuel pump having a capacity superior to said carburetor and capable of producing a constant pressure;

c. a primary circuit for feeding said cylinders with a fuel, said primary circuit comprising an accelerator valve mounted in said reservoir of said carburetor or communicating therewith and provided with a slot for each carburetion chamber, each slot being individually and separately connected to a carburetion chamber, said slots being arranged so that during acceleration, said slots are obstructed to such an extent that the flow of fuel towards the carburetion chamber is regulated depending on the position of the butterfly valves;

d. a control mechanism simultaneously connected to all said butterfly valves and to the accelerator valve in order to produce a synchronized action which will at once adjust the flow of air and of motor fuel in said carburetion chambers, thus producing a constant volume ratio of these two components of the mixture, independent of the amount of said mixture;

e. a secondary circuit which is independent from the primary circuit and from said carburetion chamber; comprising two automatically controlled valves in the reservoir of said carburetor or in communication with said carburetor and channels leading from said valves and opening outside the body of said carburetor by means of calibrated jets; there being one jet for each motor cylinder for individually and simultaneously feeding each cylinder of said motor with an excess of fuel if desired; the first valve being controlled by a thermostat, the second valve being controlled by the oil pressure of the motor;

B. a heat exchanger connected to said carburetor, a high performance heat insulating material between said carburetor and said heat exchanger, said heat exchanger comprising:

a. a body provided with a number of independent heat exchange compartments equal to the number of motor cylinders, each compartment being connected to a carburetion chamber of said carburetor for individually and separately feeding each motor cylinder;

b. means bringing combustion gases around said compartments, in order that the motor fuel of the mixture be converted into vapor during its travel inside said compartments from said carburetion chambers towards said motor cylinders;

c. a channel for each motor cylinder, said channels being independent from said compartments extending through the body of the exchanger and being connected to the secondary circuit of said carburetor for directly and separately feeding said motor cylinders with an excess of motor fuel;

C. an admission block connected to said body of said exchanger comprising the same number of admission chambers as there are motor cylinders in order to individually and separately connect each compartment of said exchanger to a motor cylinder, each admission chamber also being formed with an opening communicating with a compartment of said exchanger, and with another opening for receiving the flow from said second circuit of said carburetor, said flow passing through said channels of said exchanger and in which the admission block, more particularly the one which is intended for a V-shaped motor, is heated from underneath at a predetermined temperature by a hot water surface outgoing from the motor towards the water pump and granting a protection to the internal elements of the motor against any possible excessive overheating.

4. A system according to claim 2, in which said acceleration valve comprises a hollow piston axially sliding in a casing fixedly mounted in said reservoir and in which one end is formed with apertures, each aperture facing one said channels leading to said carburetion chamber, said hollow piston enabling communication between the reservoir and the interior of said casing in order that sliding of said piston enables an adjustment of the opening of said apertures and feeding of said channels.

5. A system according to claim 1, in which the end of the channels of the secondary circuit opening outside of the body of the carburetor is provided with a calibrated removable injection jet.

6. A system according to claim 2, in which the control mechanism which synchronizes the opening of the accelerator valve and of the butterfly valves, in order to produce a constant volume ratio of motor fuel and air, is a rack and pinion system.

7. A system according to claim 4, in which the butterfly valves are fixedly mounted on pivoting axes and in which said mechanism comprises:
 a first toothed rack with double toothed surface, slidably mounted inside said body;
 a second toothed rack axially fixed to the piston of said accelerator valve;
 a pivoting axis provided at each end with a pinion one of which meshes with said second toothed rack, the other pinion meshing with one of the toothed surfaces of the first toothed rack;
 pinions fixedly mounted at one end of the axes of said butterfly valves, these pinions meshing with the other surface of the first toothed rack, and
 means for moving the first toothed rack along a rectilinear alternative movement thus enabling by the movement of said pinions, to slide the piston of the accelerator valve and to cause pivoting of said butterfly valves.

8. A system according to claim 7, including a return spring between the first toothed rack and the body of the carburetor to produce a firm and constant contact between the toothed racks and the pinions with which said toothed racks mesh to prevent any play between said toothed racks and said pinion.

9. A system according to claim 4, in which said apertures comprise elongated slots in the direction of movement of said piston enabling a precise adjustment of the opening of said apertures.

10. A system according to claim 1, in which the ends of the channels opening in said carburetion chambers are raised in order to define fuel stoppers with the remaining part of said channels when said motor is stopped thus preventing production of air pockets in said channels.

11. A system according to claim 7, including means to prevent rotation of said piston when the latter is being moved by said second toothed rack.

12. A system according to claim 2, in which one of said automatic control valves of the secondary circuit is connected, in operation, to a thermostat which is controlled by the temperature of the motor cooling liquid.

13. A system according to claim 2, in which one of the automatic control valves of the secondary circuit is connected, in operation, to a manometer which is controlled by the oil pressure of the motor.

14. A system according to claim 12, in which said automatic controlled valves are of the electric coil type.

15. A system according to claim 2, in which the means for feeding the reservoir comprises along said channel opening into said reservoir, a differed action twin fuel pump and a pressure regulator through which the pump feeds.

16. A system according to claim 2, in which each compartment is in the shape of a zig-zag shaped passage formed of at least four rectilinear sections of alternate reversed direction, the first of said sections receiving its portion of the mixture of the carburetion chamber and the last section unloading said mixture in the admission chamber corresponding to said compartment, in which the combustion gases circulate around said passages.

17. A system according to claim 16, in which the secondary circuit of said exchanger comprises channels directly connected to the channels of said secondary circuit of said carburetor and unload in the respective admission chambers of said block.

18. A system according to claim 17, in which said carburetor and said exchanger comprise an equal number of pairs of carburetion chambers and of heat exchange compartments both of which are equally disposed on both sides of a median plane extending through said carburetor and said exchanger and in which the exhaust gases are directed around the compartments in two reverse flows, one on each side of said median plane.

19. Carburetor for internal combustion motor having a predetermined number of motor cylinders, said carburetor comprising:
 a. a body provided with a number of carburetion chambers equal to the number of motor cylinders of the motor to which said cylinder is intended, said body being provided with a motor fuel reservoir, each chamber having a pivoting butterfly valve for controlling admission of air, said body being provided with means for feeding motor fuel, said means comprising a channel opening in said reservoir for filling said reservoir;
 b. a primary circuit comprising an accelerator valve in said reservoir and channels individually connecting each carburation chamber to said accelerator valve in order that operation of said accelerator valve simultaneously and separately feed all said carburation chambers;
 c. a control mechanism which is simultaneously connected to all the butterfly valves and to the accelerator valve in order to produce a synchronized action enabling to at once adjust the flow of air and of motor fuel in said carburation chambers, thus enabling a constant volume ratio of the mixture of motor fuel and air formed in the carburation chambers; and
 d. a secondary circuit independent from said carburation chambers, said secondary circuit comprising two (2) automatically controlled valves in said reservoir and channels leading from said valves to the exterior of said body to be connected to said motor cylinders for feeding the same with an excess of motor fuel coming from said reservoir.

* * * * *